United States Patent Office 3,695,989
Patented Oct. 3, 1972

3,695,989
COLD WATER SOLUBLE FOAM PLASTIC
PACKAGE
Robert E. Albert, 321 Hampton Road,
Wilmington, Del. 19803
No Drawing. Filed Aug. 12, 1970, Ser. No. 63,285
Int. Cl. B32b 5/18
U.S. Cl. 161—160                8 Claims

ABSTRACT OF THE DISCLOSURE

Cold water soluble packages can be made from foamed films of polyvinyl alcohol, polyvinyl pyrrolidone or mixtures of the two. The film has dispersed within it a volume of gas equal to from 80 to 99% of the total volume of the film in the form of bubbles having an average diameter less than 1/3 of the thickness of the film.

BACKGROUND OF THE INVENTION

Many commonly used chemicals are produced and sold in pulverulent form but slurried, dispersed or dissolved in water when used by the consumer. Examples of these materials are pesticides, specifically, insecticides, herbicides, nematocides, and fungicides which are applied as a water spray, cleaning products such as laundry detergents, bleaches, and caustic cleansers which are dissolved in wash water, and process chemicals such as carbon black and activated charcoal which may be slurried in water and pigments and dyes which are dissolved or dispersed.

There are several problems associated with the use of these types of products. The first of these problems is exposure of the user and his immediate surroundings to the chemical. Opening a package of finely ground material, measuring an amount of the material and transferring the measured amount from the package to the equipment where the material is contacted with water can generate airborne dust which contacts the user and contaminates the area. A pesticide dust could be irritating to the eyes and mucous membranes of the nose and throat of the user. A herbicide dust could damage plants in the area where the packages are opened. Dusts of pigments or activated charcoal present servere clean-up problems.

The second problem in using common pulverulent chemicals is accuracy of measurement. Clearly, overcharging of expensive materials is costly. Use of a weak solution or dispersion of a herbicide will not properly control the undesired plant species. Use of too strong a solution or dispersion of the same material may damage some desired plants as well as the undesired weeds. It is frequently extremely difficult to accurately measure and transfer powdery materials in areas exposed to wind or to measure materials which have become compacted and lumpy in their packages.

Finally, after the chemical has been used, the user is faced with the problem of disposing of the package in which the chemical was delivered. It may contain residual amounts of a material which is a pollution problem, potentially hazardous to humans, harmful to plants and animals, or merely unpleasant and unsightly.

One approach to this problem is to package the dry chemical being used in a water soluble package which can be placed in water without being opened.

Rapid dissolution in cold water is a particularly important factor in selecting packaging films for products which are normally dissolved or dispersed prior to use. For example, agricultural pesticides which are made up as solutions, suspensions or slurries for spraying in the field where warm or hot water is not available. Complete dissolution is important to prevent plugging of spray nozzles, screens, lines and pumps associated with spraying practices. In order to meet these requirements, package dissolving times of 1 minute or less are preferred in water, which under field conditions, is frequently below about 45° F. Water soluble films of the art require more than three minutes to dissolve and some are only swollen by water at 45° F. Dissolution times of these films are decreased to some extent by increasing the water temperature to 100° F. or above. However, for agricultural purposes it is highly impractical and uneconomical to spray large quantities of water elevated temperatures. Furthermore, before solutions, suspensions or slurries of pesticides could be sprayed, it would be necessary to allow the mixtures to cool to a temperature which could be tolerated by the particular crop, either by permitting the mixture to stand, or by diluting with cold water. In addition, some pesticides are rapidly degraded in water at elevated temperatures, which is further reason for avoiding the use of hot water.

It is an object of this invention to provide cold water soluble foamed polymeric films which may be used as packages for pulverulent materials. The film package containing the material can be directly charged to the water, thus eliminating problems of the user's contact with the chemical in the package, exact measuring and container disposal.

SUMMARY OF THE INVENTION

Cold water soluble packages may be made using a 2 to 50 mil thick film comprising a polymer having an average molecular weight greater than 80,000 selected from the group consisting of polyvinyl alcohol, polyvinyl pyrrolidone, and mixtures of polyvinyl alcohol and polyvinyl pyrrolidone. The film of this invention has uniformly dispersed within it gas bubbles having an average diameter less than 1/3 of the total thickness of the film and having a total volume of from 80 to 99% of the total volume of the film. As used herein, the term polyvinyl alcohol means hydrolyzed polyvinyl acetate, the degree of hydrolysis being a maximum of 90 mol percent.

Packages prepared from this film are rapidly soluble, eliminating the need for hot water to effect dissolution. They prevent exposure of the user to the contents of the packaging, removing potential health hazards. They permit accurate amounts of the contents to be used without handling the material directly. They prevent problems arising in the disposal of the packages having small amounts of material remaining in them.

DESCRIPTION OF THE PREFERRED EMBODIMENTS

Films of high molecular weight polyvinyl alcohol and polyvinyl pyrrolidone with no gas bubbles dispersed therein are soluble in cold water. However, their rate of solution is so slow as to make their use for water soluble packages impractical. Dissolution times are dependent upon molecular weight. Films prepared from low molecular weight (20,000) polymers dissolve in about 1/2 hour in 50° F. water, whereas films prepared from high molecular weight (80,000) require up to 72 hours or longer to dissolve in 50° F. water. Films of the same polymers having dispersed within them a volume of gas bubbles equal to from 80 to 99% or more preferably, 85 to 98% of the total volume of the film, dissolve in two minutes or less in water at a temperature below about 50° F.

Packaging films must exhibit flexibility, that is, ability to accept a crease without cracking or becoming seriously weakened, in order to be useful. The bubble containing, or foamed films of this invention, are thicker than dense films at the same weight per unit area due to the presence of the bubbles. In order that the foam films exhibit sufficient flexibility and strength to make suitable packaging films, they must be fabricated from polymers of molecular weight of about 80,000 or greater.

In order to prepare the films described herein, aqueous solutions having solution viscosities of from about 200 to about 800 poises of the polymers having an average molecular weight of more than about 80,000 are required. Bubbles are dispersed in the polymer solution by whipping air (or other gas) into the solution. The agitation should be sufficiently vigorous so the bubbles formed have an average diameter less than ⅓ of the thickness of the film to be cast.

Bubbles are not easily dispersed in solutions having a viscosity greater than about 800 poises. If the solution viscosity is less than about 200 poises, the bubbles dispersed in the film tend to collapse before it is dried.

The films of this invention can be made by doctor knife casting solutions of the polymers onto 0.010 inch thick Mylar® polyester film supported on a flat glass plate. The dried cast films can be readily stripped from the polyester. They cannot be stripped from polyethylene or glass. Du Pont Teflon® polyfluorocarbon is not a suitable casting surface, since it is not readily wettable by the aqueous polymer solution.

Good knife casting performance requires a casting solution viscosity of from about 100 to 1500 poises. Aqueous solutions of the polymer mixtures of this invention having a solids content of from about 10 to 50%, depending on average molecular weight, fall within the desired viscosity range. The films may be cast such that the dried films are from 2 to 50 mils thick. Film thicknesses of 2 to 35 mils are preferred.

The cast films may be dried at room temperature, or temperatures up to about 90° C. and stripped from the casting surface. On all but dry cold days, elevated drying temperatures are necessary, preferably on Mylar® sheet, to prevent sticking in handling and storage the water-sensitive mixed polymer films.

Packages may be made from the films of this invention on many of the commercially available types of plastic film package making machinery. In the laboratory, bags may be made from the dry films of this invention in the following manner. Carefully wet a ¼ inch band along 3 edges of a rectangular piece of the film. Place a second piece of film of the same size as the first piece over the first piece and exert mild pressure along the wetted edges. A bag with 3 sealed edges will result. It may be filled with a powder and the fourth edge sealed in the same manner as the other three. Heat sealing may also be used with temperatures of about 120–140° C. and pressures of about 5–25 lb./in.²

Clearly, films as rapidly soluble as those of this invention cannot be allowed to come into contact with water prior to the desired time. Therefore, packages made of these films must be protected during handling from dew, rain, high humidity atmosphere and accidental exposure to water by splashing or wet hands. The film packages must be overwrapped with a moisture barrier such as polyethylene film, polypropylene, film moisture proof cellophane, water proofed kraft paper, waxed paper and the like. The moisture proof overwrap can be provided for either individual packages or groups of packages. When the moisture proof package is removed, the soluble package must be otherwise protected from contact with water or it must be used promptly.

The disposal of this moisture proof overwrap presents no health or pollution hazard as does the disposal of a normal package for potentially harmful material. Since the overwrap has not contacted the contents of the film package, no residual amounts of the potentially harmful contents remain in it. The film package itself, of course, completely dissolves and, therefore, it can create no disposal problem.

Packages as have been described herein are particularly useful where the material to be handled is to be used in water solutions or dispersion, and is dusty, irritating, or toxic. Examples of such products are laundry bleaches, caustic cleaning powders such as trisodium phosphate, and agricultural chemicals, such as herbicides, plant growth regulants, insecticides, nematocides, miticides and fungicides.

The following specific examples and related test procedures further illustrate the invention herein described.

DETERMINATION OF BUBBLE VOLUME IN FILM

Film thicknesses are measured with a film thickness gauge and the volume of a known area of film is calculated. The densities of the film having bubbles therein and a solid bubble free film composed of an identical polymer are determined from the weight and the volume of the film samples. The bubbles volume of the foamed film expressed as a percentage of total film volume equals $$100\left(1 - \frac{df}{ds}\right)$$

where $df$=density of the foamed film and $ds$=density of the solid bubble free film.

DETERMINATION OF BUBBLE DIAMETER

Bubble size is determined by microscopic examination of a cross-section of the bubble containing film. The cross-section is prepared by folding a portion of the film under pressure just sufficient to hold the film between two steel gauge blocks placed congruently with the film extending beyond the blocks. A single edge razor blade is held at a very slight acute angle to the gauge blocks and drawn along the surface of the block in a direction parallel to the long dimension of the exposed film edge, trimming away the portion of the film extending beyond the blocks. The blocks are then positioned under the objective lens of a microscope having a magnifying power of at least 10× and fitted with eyepiece upon which is a linear scale. From the calibration of the eyepiece scale and the overall magnification of the microscope, the diameter of a group of typical bubbles is determined and the average bubble diameter calculated.

DISSOLVING RATE OF FILM

The rate of dissolution of the dried film is determined by measuring the time required to dissolve a 5 cm. x 5 cm. portion of the film in tap water at 40 to 45° F. The film is dropped into 250 ml. of water in a 400 ml. beaker. The water is slowly stirred, just enough to keep the water in motion. The time for dissolution is the period from initial contact of the film with water until undissolved film particles can no longer be seen with the naked eye.

FLEXIBILITY TEST

Plastic films suitable for packaging must exhibit flexibility. Flexibility of films is judged to be acceptable if no cracks appear in a 5 cm. x 5 cm. piece of film folded and creased by fingernail pressure.

Example 1

About 100 g. of an aqueous solution containing 20% by weight of "Elvanol" 52–22 polyvinyl alcohol of weight average molecular weight of about 83,000, which is 87–89 mol percent hydrolyzed polyvinyl acetate, is placed in a 3 quart Hobart Mixer kettle and beaten with a wire whip potato beater at 460 r.p.m. The resulting foam is beaten until no further volume increase is noted. A stiff, fine bubble, stable foam results. The foam is cast into a film, 0.020 inch thick and 8 inches wide x 24 inches long on a 0.010 inch thick Mylar® polyester sheet supported on a flat glass plate. The film is air dried at room temperature for 24 hours at about 50% RH, and stripped from the Mylar® polyester surface. The thickness of this film is measured to be 0.0059 inch. The density of the foamed film is 0.0525 g./cc. while the density solid bubble free film of the same polymer is 1.180 g./cc. The bubble content of the foamed film is calculated to be 95.6 volume percent with an average bubble diameter of 0.0018 inch. The dissolving time is 0.5 minute in water at 40° F. and the film exhibits good flexibility.

Two 6 inch x 5 inch pieces are cut from the film. One piece is placed on a 0.010 inch thick Mylar® polyester sheet and a ⅜ inch strip along the two 6 inch edges and one 5 inch edge are dampened with water sprayed from a De Vilbiss No. 114 atomizer. The second 6 inch x 5 inch piece of the film is placed in contact and congruent with the piece with the dampened edges. Very slight pressure is applied and the films are allowed to dry while in contact. A bag with one 5 inch open edge results. The bag is filled with one pound of finely divided trisodium phosphate and the open 5 inch edge is sealed. In order to protect the filled foam film package from contact with moisture, it is sealed inside a polyethylene bag slightly larger than the soluble film package.

Example 2

One hundred grams of an aqueous solution containing 15% by weight of polyvinyl alcohol of weight average molecular weight of about 122,000 which is 87–89 mol percent hydrolyzed polyvinyl acetate is converted into a foam as in Example 1. A film is cast as in Example 1 with a casting slot of 0.015 inch. The dried 8 inch x 24 inch film is 0.0102 inch thick with an average bubble diameter of 0.003 inch and has a bubble content of about 97.2 volume percent. The dissolving time of the film is determined to be about 1.2 minutes in water at 45° F. Excellent flexibility is observed when the film is tested in the flexibility test.

A bag is prepared from the film as described in Example 1, and filled with 1 pound of Du Pont Lannate® methomyl insecticide. The package containing the insecticide is dropped into 20 gallons of stirrer water. A clear solution, free of undissolved polymer is observed after 2 minutes of stirring. This solution is pumped through an agricultural type spray nozzle fitted with a 100 mesh screen. The entire 20 gallons passes through the nozzle, with no evidence of plugging or pressure increase. Examination of the nozzle and screen after all the slurry is pumped through reveals no pluggage, or even restricted flow due to undissolved polymer.

Example 3

One hundred grams of the aqueous polyvinyl alcohol of Example 2 is foamed as in Example 1. A film is cast as in Example 1, using a casting slot of 0.010 inch. The dried film has an average bubble diameter of 0.003 inch, a thickness of 0.005 inch and a bubble content of 85.2 volume percent. This film exhibits an excellent flexibility and dissolves in 2 minutes in room temperature tap water.

A bag prepared as in Example 1 from this foam is filled with one pound of Thylate® thiram fungicide containing 65 weight percent thiram and is sealed inside a polyethylene bag as in Example 1.

The soluble foam film package is subsequently removed from the polyethylene bag and dropped into 20 gallons of stirred water. Within several seconds, a slurry of the thiram fungicide forms and is stirred for about 2 minutes. The slurry is then pumped through the nozzle and screen arrangement of Example 2. Examination of the nozzle and screen after the entire 20 gallons is pumped through reveals no evidence of gels or other undissolved polymer.

Example 4

One hundred grams of an aqueous solution containing 45% by weight of polyvinyl pyrrolidone of weight average molecular weight of 160,000 is converted into a foam as in Example 1. A film is cast as in Example 1 with a casting slot width of 0.080 inch. The cast film is dried on the supporting Mylar® film in an air circulating oven at 75° C. for 1 hour. The dried 8 x 24 inch film is 0.045 inch thick with an average bubble diameter of 0.005 inch and has about 85.5 volume percent bubbles. The dissolving time of the film is determined to be 1.9 minutes in water at 40° F. The film exhibits excellent flexibility.

A bag is prepared from the film as in Example 1 and one-half pound of Du Pont Benlate® benomyl fungicide is sealed into the bag. The foamed polyvinyl pyrrolidone bag is then sealed inside a moistureproof cellophane bag and stored six months at 65% R.H. and 75° F. The contents of the package remain dry and free-flowing, indicating that no moisture is adsorbed by the pesticide.

The water soluble package is removed from the outer wrapping and placed into 50 gallons of stirred water at 50° F. A uniformly dispersed slurry is observed after 2 minutes, and is pumped through an agricultural type spray nozzle assembly fitted with a 100 mesh screen. The entire 100 gallons of the suspension is sprayed through the nozzle with no evidence of plugging or pressure increase. Examination of the nozzle and screen after all the slurry is pumped through shows no pluggate or restricted flow due to undissolved polymer.

Example 5

Fifty grams of the aqueous solution of polyvinyl alcohol of Example 1 and 17 grams of the aqueous solution of the polyvinyl pyrrolidone of Example 4 are mixed together and foamed as in Example 1. Film of the mixed polymer foam is cast onto the Mylar® film of Example 1, using a 0.050 inch wide casting slot. The film is dried in an air circulating oven as in Example 4. The dried film is 0.026 inch thick and has a bubble volume of 91% with an average bubble size of 0.0080 inch. The dried film exhibits excellent flexibility, showing no effect of creasing in the flexibility test. The dissolving time is 0.7 minute in water at 40° F.

A bag is made from the foamed film as in Example 1 and prior to sealing is filled with one pound of Du Pont Lannate® methomyl insecticide. The water-soluble package is then sealed inside an overwrap of moistureproof polyvinyl chloride coated kraft paper. The water-soluble inner package and contents show no adverse effects from moisture after several months storage at high relative humidity.

The water-soluble bag and contents are placed into 20 gallons of stirred water at 50° F. and a clear solution is observed after 1.7 minutes. The solution is sprayed as in Example 2 with no evidence of pluggage or restricted flow from undissolved polymer observed either during spraying or subsequent examination of the nozzle or screen.

I claim:

1. A 2 to 50 mil thick cold water soluble film consisting essentially of a polymer having an average weight greater than 80,000 selected from the group consisting of polyvinyl alcohol, polyvinyl pyrrolidone and mixtures of polyvinyl alcohol which is up to 90 mol percent hydrolyzed polyvinyl acetate and polyvinyl pyrrolidone, the film having uniformly dispersed therein gas bubbles having an average diameter less than ⅓ of the total thickness of the film, said gas bubbles having a total volume of from 80 to 99% of the total volume of the film.

2. The film of claim 1 having a thickness of 5 to 35 mils.

3. The film of claim 1 wherein the gas bubbles have a total volume of from 85 to 98% of the total volume of the film.

4. The film of claim 1 having a dissolving time in water at 40° F. of less than 2 minutes.

5. The film of claim 2 having a dissolving time in water at 40° F. of less than 2 minutes.

6. The film of claim 3 having a dissolving time in water at 40° F. of less than 2 minutes.

7. The package comprised of the film of claim 1.

8. The package of claim 7 having a removable moistureproof overwrap.

References Cited

UNITED STATES PATENTS

| | | | |
|---|---|---|---|
| 2,328,844 | 9/1943 | Osterhof | 117—139 |
| 2,546,705 | 3/1951 | Strawinski | 161—160 |
| 3,318,856 | 5/1967 | Deyrup | 260—2.5 R |
| 3,387,405 | 6/1968 | Iwasyk et al. | 260—2.5 R |
| 3,492,250 | 1/1970 | Deyrup | 260—17.4 |

OTHER REFERENCES

"Polyvinyl Alcohol" by Norbert Platzer, published March 1951 in "Plastics," p. 95.

MORRIS SUSSMAN, Primary Examiner

U.S. Cl. X.R.

99—171 LP; 117—139; 161—165; 206—46; 220—DIG 30; 260—2.5 R, 17.4